(12) United States Patent
Weng et al.

(10) Patent No.: US 8,572,200 B2
(45) Date of Patent: Oct. 29, 2013

(54) MASTER/SLAVE DECISION DEVICE AND MASTER/SLAVE DECISION METHOD APPLIED TO NETWORK DEVICE

(75) Inventors: Chi-Shun Weng, Hsinchu County (TW); Liang-Wei Huang, Hsinchu City (TW); Ming-Feng Hsu, Taipei City (TW); Yuan-Jih Chu, Hsinchu City (TW)

(73) Assignee: Realtek Semiconductor Corp., Hsinchu (TW)

( * ) Notice: Subject to any disclaimer, the term of this patent is extended or adjusted under 35 U.S.C. 154(b) by 360 days.

(21) Appl. No.: 13/175,879

(22) Filed: Jul. 3, 2011

(65) Prior Publication Data

US 2012/0011217 A1 Jan. 12, 2012

(30) Foreign Application Priority Data

Jul. 6, 2010 (TW) .............................. 99122093 A

(51) Int. Cl.
*G06F 15/16* (2006.01)

(52) U.S. Cl.
USPC ............................ 709/209; 380/210; 714/2

(58) Field of Classification Search
None
See application file for complete search history.

(56) References Cited

U.S. PATENT DOCUMENTS

| | | | |
|---|---|---|---|
| 6,819,730 B2* | 11/2004 | He ................................ 375/376 |
| 7,000,031 B2* | 2/2006 | Fischer et al. ................. 709/248 |
| 7,506,222 B1* | 3/2009 | Talbot ............................ 714/707 |
| 7,613,234 B2* | 11/2009 | Raghavan et al. ............. 375/219 |
| 8,320,411 B1* | 11/2012 | Sedarat et al. ................. 370/503 |
| 2003/0021371 A1* | 1/2003 | He ................................ 375/376 |
| 2004/0240451 A1* | 12/2004 | Lee et al. .................... 370/395.5 |
| 2004/0247022 A1* | 12/2004 | Raghavan et al. ............. 375/219 |
| 2006/0155802 A1* | 7/2006 | He et al. ........................ 709/203 |
| 2006/0156115 A1* | 7/2006 | Kim et al. ...................... 714/724 |
| 2007/0208819 A1* | 9/2007 | Talbot et al. .................. 709/208 |
| 2010/0008235 A1* | 1/2010 | Tinnakornsrisuphap et al. ............................. 370/241 |
| 2010/0151791 A1* | 6/2010 | Yi et al. ........................ 455/41.3 |
| 2010/0191352 A1* | 7/2010 | Quail ............................. 700/90 |

* cited by examiner

*Primary Examiner* — Ninos Donabed
(74) *Attorney, Agent, or Firm* — McClure, Qualey & Rodack, LLP

(57) ABSTRACT

A master/slave decision device applied to a first network device is provided, where the first network device is coupled to a second network device, and the master/slave decision device includes a seed distance detection unit and a decision unit. The seed distance decision unit is utilized for detecting a seed distance between a first seed utilized in a first scrambler of the first network device and a second seed utilized in a second scrambler of the second network device. The decision unit is coupled to the seed distance detecting unit, and is utilized for determining the first network device to be a master device or a slave device according to the seed distance.

16 Claims, 7 Drawing Sheets

MASTER/SLAVE DECISION DEVICE AND MASTER/SLAVE DECISION METHOD APPLIED TO NETWORK DEVICE

BACKGROUND

1. Technical Field

The disclosure relates to a master/slave decision device applied to a network device.

2. Description of the Prior Art

In the High-Definition Multimedia Interface (HDMI) standard version 1.4, a fast Ethernet standard is adopted to transmit data having the data rate equal to 100 Mbps. In the conventional fast Ethernet standard, a transmission signal and a receiving signal of a network device are transmitted on different channels. Therefore, the transmission signal will not bounce back and cause echo. However, in the HDMI Ethernet & Audio Return Channel (HEAC), the receiver requires an additional echo canceller to cancel the transmission signal from its own to prevent from interfered by its transmission signal because the transmission signal and the receiving signal are transmitted on a single pair of transmission line and the echoes are caused thereby.

However, when both a network device and another network device send out the same signal at the same time, the receiving end of the network device is unable to distinguish whether the received signal is from the other network device or the echo signal caused by the transmission signal. If the received signal is from the other network device, the network device should receive this signal; and if the received signal is caused by the transmission signal, the received signal should be cancelled. For example, FIG. 1 is a diagram illustrating a scrambler 100 applied in fast Ethernet. The scrambler 100 includes eleven registers D1-D11 and two adders 102 and 104, where the values of the registers D1-D11 serve as a seed. When both the network device and the other network device do not send out packets, a source stream DS will be a series of "1", at this time when seeds of their scramblers are the same, the transmission signals TS of both the network device and the other network device will also be the same. It is noted that, because of the signal delay on the transmission line and inter-symbol interference (ISI), the interference happens when the seed distance between the scramblers of the network device and the other network device is not large enough. In addition, because the local clocks of the network device and the other network device may be slightly different, the seed overlap issue may be occurred over time.

BRIEF SUMMARY

In an exemplary embodiment, a master/slave decision device applied to a network device is disclosed, which can prevent the seed overlap issue between two scramblers of two connected network devices, to solve the above-mentioned problems.

In another exemplary embodiment, a master/slave decision device applied to a first network device is disclosed, where the first network device is coupled to a second network device, and the master/slave decision device comprises a seed distance detection unit and a decision unit. The seed distance decision unit is utilized for detecting a seed distance between a first seed utilized in a first scrambler of the first network device and a second seed utilized in a second scrambler of the second network device. The decision unit is coupled to the seed distance detecting unit, and is utilized for determining the first network device to be a master device or a slave device according to the seed distance, where when the decision unit determines the first network device to be the master device, the first network device utilizes a first clock to transmit data; and when the decision unit determines the first network device to be the slave device, the first network device utilizes a second clock to transmit data, where the second clock is different from the first clock.

In another exemplary embodiment, a master/slave decision method applied to a first network device is disclosed, where the first network device is coupled to a second network device, and the master/slave decision method comprises: detecting a seed distance between a first seed utilized in a first scrambler of the first network device and a second seed utilized in a second scrambler of the second network device; and determining the first network device to be a master device or a slave device according to the seed distance, where when it is determined that the first network device is the master device, the first network device utilizes a first clock to transmit data; and when it is determined that the first network device is the slave device, the first network device utilizes a second clock to transmit data, where the second clock is different from the first clock.

These and other objectives of the disclosures will no doubt become obvious to those of ordinary skill in the art after reading the following detailed description of the embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 2:
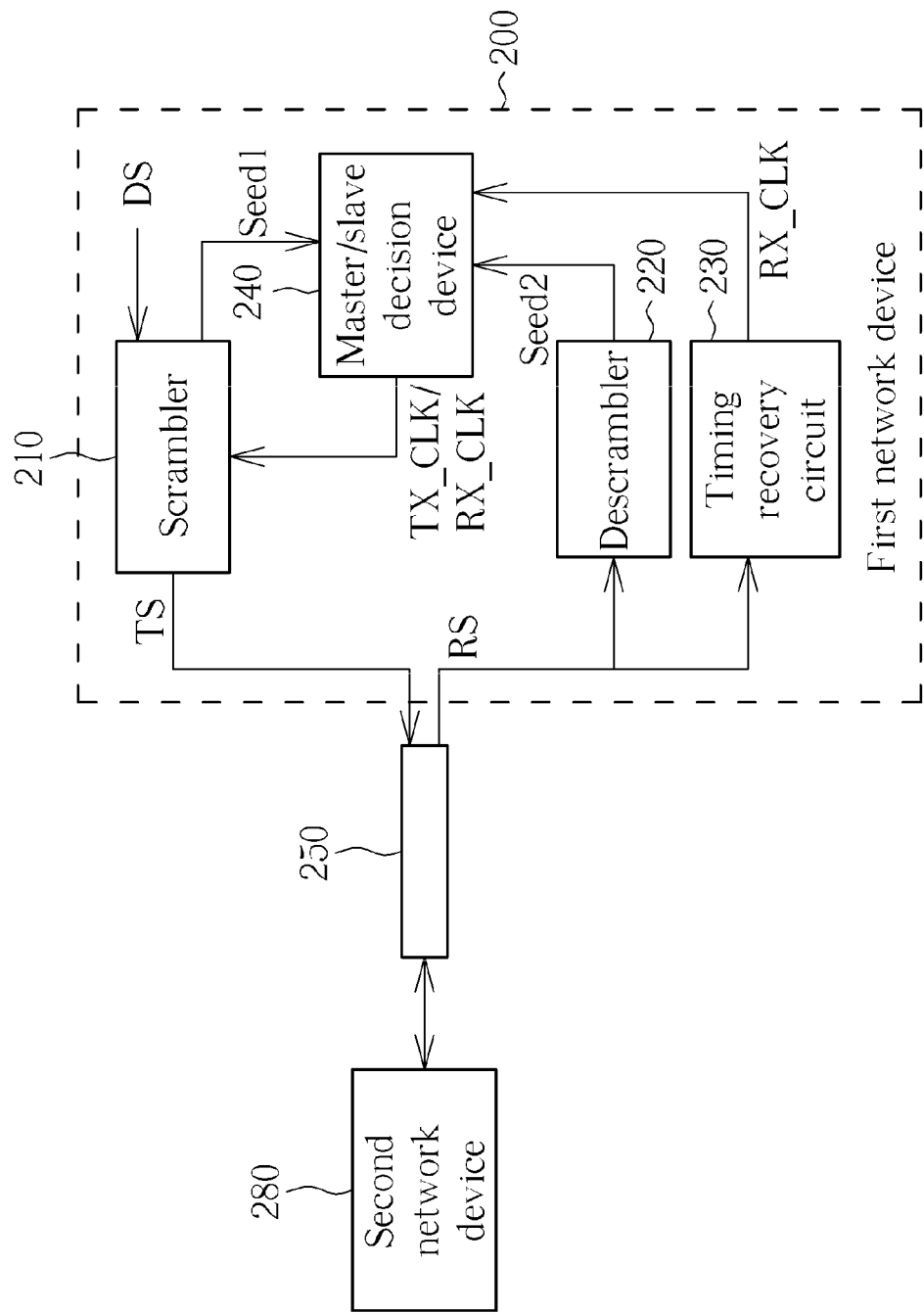
FIG. 2 is a diagram illustrating a first network device according to a first embodiment.

Please refer to FIG. 2. FIG. 2 is a diagram illustrating a first network device 200 according to a first embodiment. As shown in FIG. 2, the first network device 200 includes, but is not limited to, a scrambler 210, a descrambler 220, a timing recovery circuit 230 and master/slave decision device 240, where the first network device 200 is coupled to a second network device 280 via a high-definition multimedia interface (HDMI) 250. In addition, in this embodiment, the first network device 200 adopts HDMI standard version 1.4, but it is not meant to be a limitation of the present invention.

Figure 1:
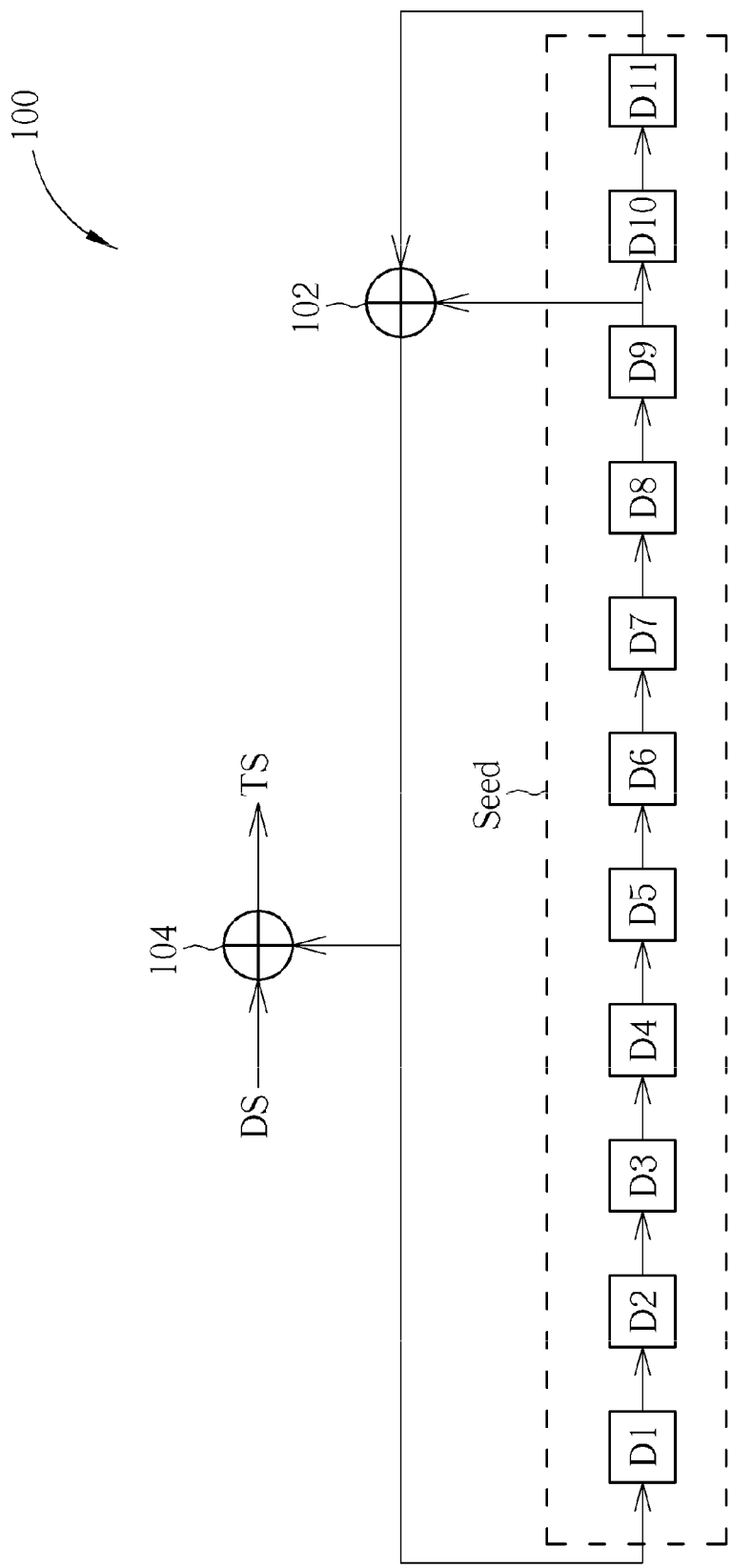
FIG. 1 is a diagram illustrating a scrambler applied in fast Ethernet

In this embodiment, the scrambler 210 can be implemented by the circuit structure shown in FIG. 1. For the operations of the scrambler 210, in simple terms, the scrambler 210 is a device used for scattering a data stream DS into another data stream with a series of discrete ones "1" and discrete zeros "0" at the transmitting side. As a result, the second network device 280 is able to obtain the accuracy of sampling rate, and it makes the probability of occurrence of "1" and "0" nearly half, respectively. That is to say, the data can become random so as to achieve the optimum decoding error rate. In this embodiment, during the initial network connection, a control unit (not shown) may select an initial value of a set of registers D1-D11 as a first seed Seed1, where the initial value of the set of registers D1-D11 includes 11 bits selected from a periodical pseudo-noise sequence (PN sequence) having a length of 2047 bits, and the pseudo-noise sequence repeats every 2407 bits. That is, the cycle time of the first seed Seed1 is equal to 2047 (i.e., a length of the scrambler 210 is 2047). After performing logic operations upon the first seed Seed1 and the data stream DS, the transmission signal TS is generated accordingly. Furthermore, the number of the registers D1-11 is merely for illustrating the features of the exemplary embodiment, and by no means to be considered as limitations to the scope of the present invention. In addition, constituent circuits of the descramber 220 are similar to constituent circuits of the scrambler 210, and thus the descramber 220 is capable of decoding a second seed Seed2 from the received signal RS. Please note that, as a person skilled in the art can readily understand detailed operating principles of the scrambler 210 and the descrambler 220, further description is omitted here for brevity.

In the operations of the first network device 200, after the network connection is established, the scrambler 210 encodes the source stream DS to generate the transmission signal TS according to the first seed Seed1, and the descrambler 220 decodes the received signal RS from the second network device 280 to generate a second seed Seed2, where the second seed Seed2 can be regarded as a seed used by a scrambler of the second network device 280 to transmit the signal RS to the first network device 200. In addition, the timing recovery circuit 230 performs a timing recovery operation upon the received signal RS to generate a recovery clock RX_CLK, where a frequency of the recovery clock RX_CLK is substantially the same as a frequency of a local clock disposed in the second network device 280. Then, the master/slave decision device 240 determines the first network device 200 to be a master device or a slave device according to a seed distance between the first seed Seed1 and the second seed Seed2. If the first network device 200 is determined to be the master device, the first network device 200 uses its own local clock TX_CLK to transmit data; and if the first network device 200 is determined to be the slave device, the first network device 200 uses the recovery clock RX_CLK to transmit data.

Figure 3:
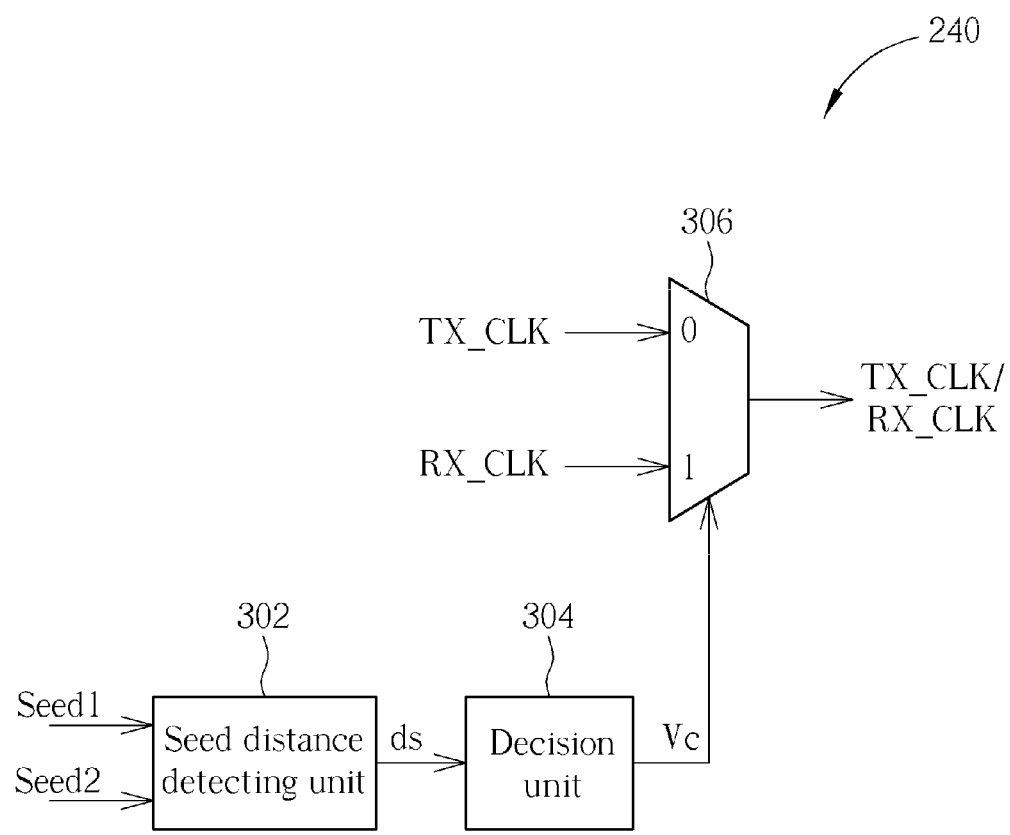
FIG. 3 is a diagram illustrating the master/slave decision device shown in FIG. 2 according to one embodiment.
Figure 4:
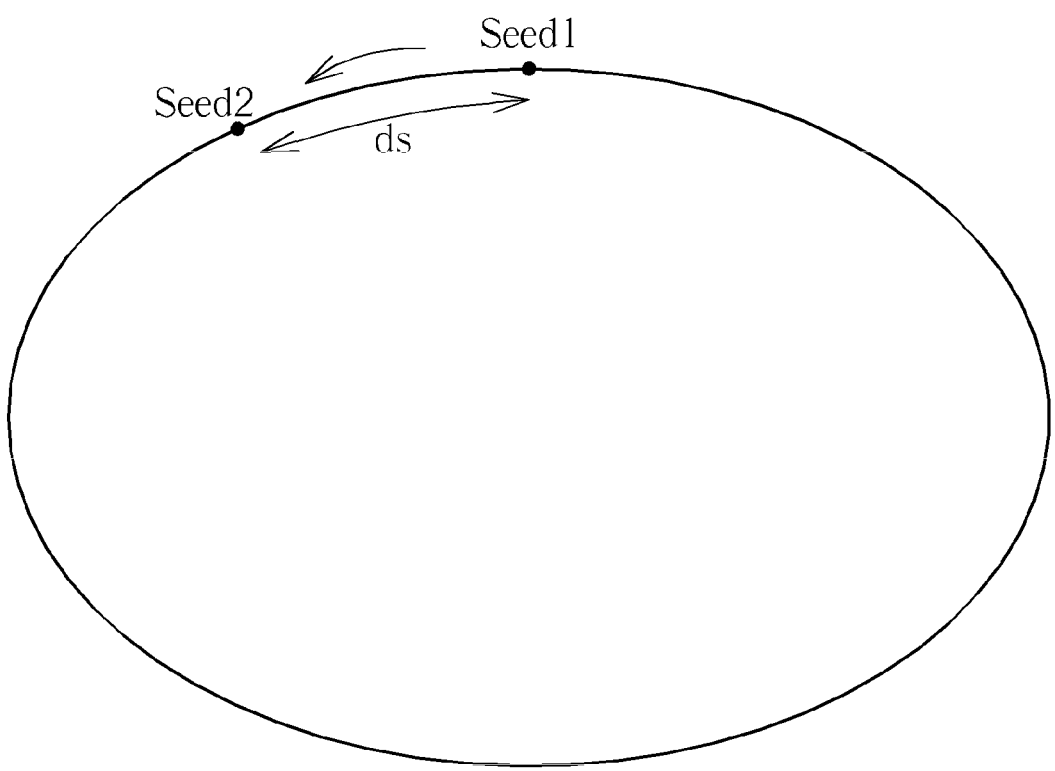
FIG. 4 is a diagram illustrating determining the seed distance ds.

Please refer to FIG. 3. FIG. 3 is a diagram illustrating the master/slave decision device 240 according to one embodiment. As shown in FIG. 3, the master/slave decision device 240 includes a seed distance detecting unit 302, a decision unit 304 and a multiplexer 306. In the operations of the master/slave decision device 240, the seed distance detecting unit 302 detects a seed distance ds between the first seed Seed1 and the second seed Seed2. In detail, please refer to FIG. 4, FIG. 4 is a diagram illustrating determining the seed distance ds. It is noted that, FIG. 4 is merely utilized for explaining a concept of the seed distance ds, and is not meant to be a limitation of the present invention. The ellipse shown in FIG. 4 shows a cycle of the seed of the scrambler 210. Assuming that the scrambler 210 has the circuit structure shown in FIG. 1, there are 2047 points (not shown) positioned on the ellipse, each of the points represents a seed value, and the seed value is moved point-by-point in counterclockwise. If the seed distance ds=160, this represents that the first seed Seed1 will be equal to the second seed Seed2 after 160 clock periods, that is, the values within the registers D1-D11 move right 160 times; if the seed distance ds=(−130), this represents that the first seed Seed1 leads the second seed Seed2 by 130 clock periods.

Then, the decision unit 304 determines the first network device 200 to be a master device or a slave device according to the seed distance ds. In detail, when the seed distance ds is lower than a threshold value, this represents that the first seed Seed1 and the second seed Seed2 may be oncoming to be overlapped or mutual interfered. Therefore, the decision unit 304 determines the first network device 200 to be the slave device, and transmits a control signal Vc to the multiplexer 306 to make the first network device 200 use the recovery clock RX_CLK outputted from the multiplexer 306 to transmit data. Because the frequency of the recovery clock RX_CLK is substantially equal to the frequency of the local clock of the second network device 280, the first network device 200 and the second network device 280 use the clocks having the same frequency to transmit data. That is, the seed distance ds between the first seed Seed1 and the second seed Seed2 will become a constant value and will not become smaller over time. On the other hand, when the seed distance ds is greater than a threshold value, this represents that the first seed Seed1 and the second seed Seed2 may not be overlapped or mutual interfered. Therefore, the decision unit 304 determines the first network device 200 to be the master device, and transmits the control signal Vc to the multiplexer 306 to make the first network device 200 use the local clock TX_CLK outputted from the multiplexer 306 to transmit data.

In detail, in one embodiment of the present invention, when the seed distance ds is between N and M (i.e., N>ds>M), or is between (−M) and (−K) (i.e., (−M)<=ds<(−K)), this represents that the first seed Seed1 and the second seed Seed2 may be oncoming to be overlapped or mutual interfered, therefore, the decision unit 304 determines the first network device 200 to be the slave device, where N, M, K are positive integers, N is greater than M, and M is greater than K (in one embodiment, N, M, K can be 200, 150, 100, respectively). When the seed distance ds is between M and (−K) (i.e., M<ds<(−K)), this represents that the first seed Seed1 and is too close to the second seed Seed2, therefore, the first network device 200 will re-link to the second network device 280, and a control unit (not shown) may randomly provide an initial value to the scrambler 210 as the first seed Seed1.

In the embodiments shown in FIG. 2 and FIG. 3, the decision unit 304 determines the first network device 200 to be the slave device only when the first seed Seed1 and the second seed Seed2 approach to each other. However, when the first network device 200 and the second network device 280 establish the link by using Energy Efficient Ethernet (EEE) 100M/1000M, the first seed Seed1 and the second seed Seed2 may suddenly become too close after the first network device 200 is awaken from a sleep mode, causing seed overlap issue or a situation that the two network devices require to re-link. Therefore, in the following embodiment, the first network device is immediately determined to be the master device or the slave device after the network connection is established.

Figure 5:
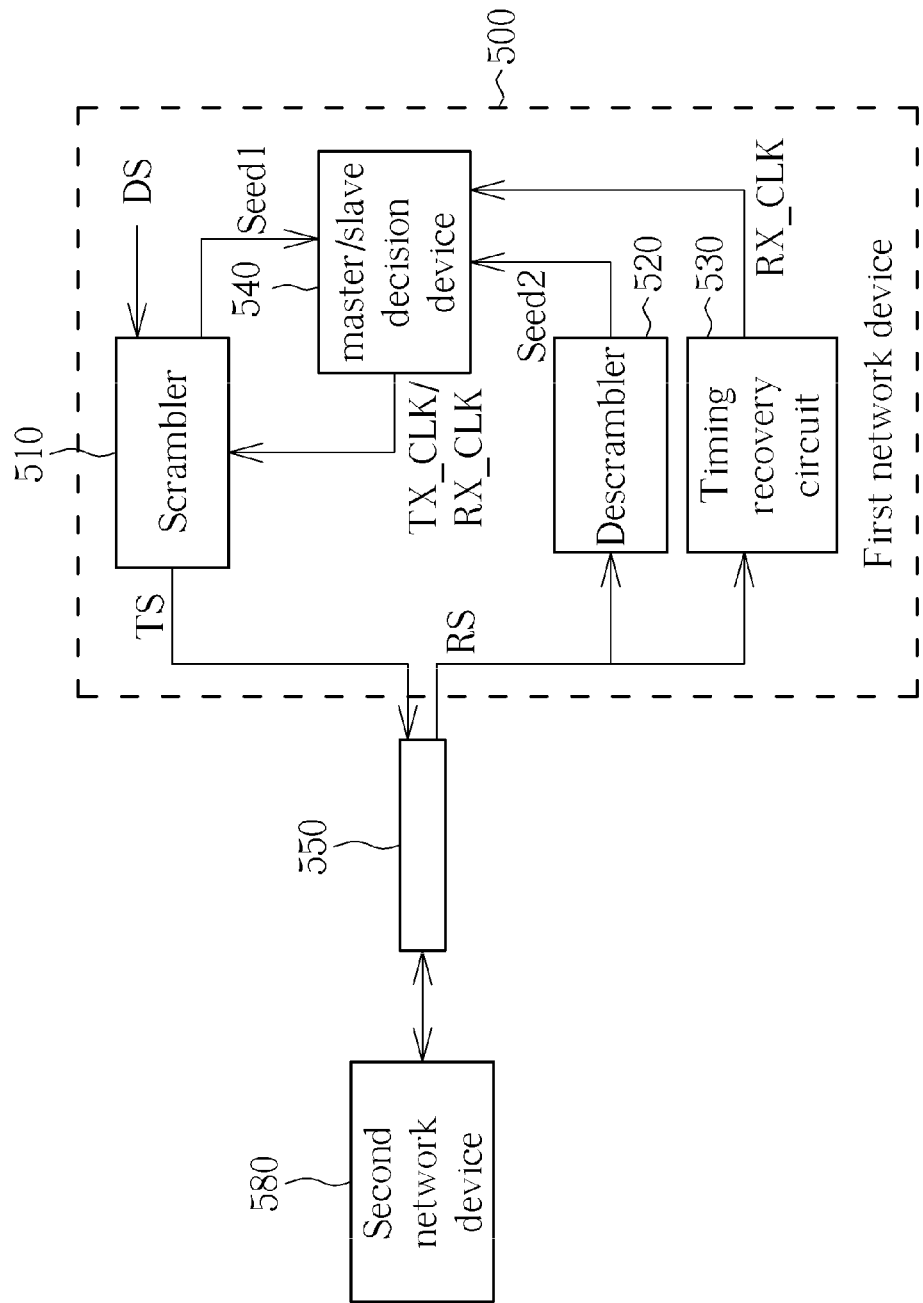
FIG. 5 is a diagram illustrating a first network device according to a second embodiment.

Please refer to FIG. 5. FIG. 5 is a diagram illustrating a first network device 500 according to a second embodiment of the present invention. As shown in FIG. 5, the first network device 500 includes, but is not limited to, a scrambler 510, a descrambler 520, a timing recovery circuit 530 and master/slave decision device 540, where the first network device 500 is coupled to a second network device 580 via a high-definition multimedia interface (HDMI) 550. In addition, in this embodiment, the first network device 500 adopts HDMI standard version 1.4, but it is not meant to be a limitation of the present invention.

Figure 6:
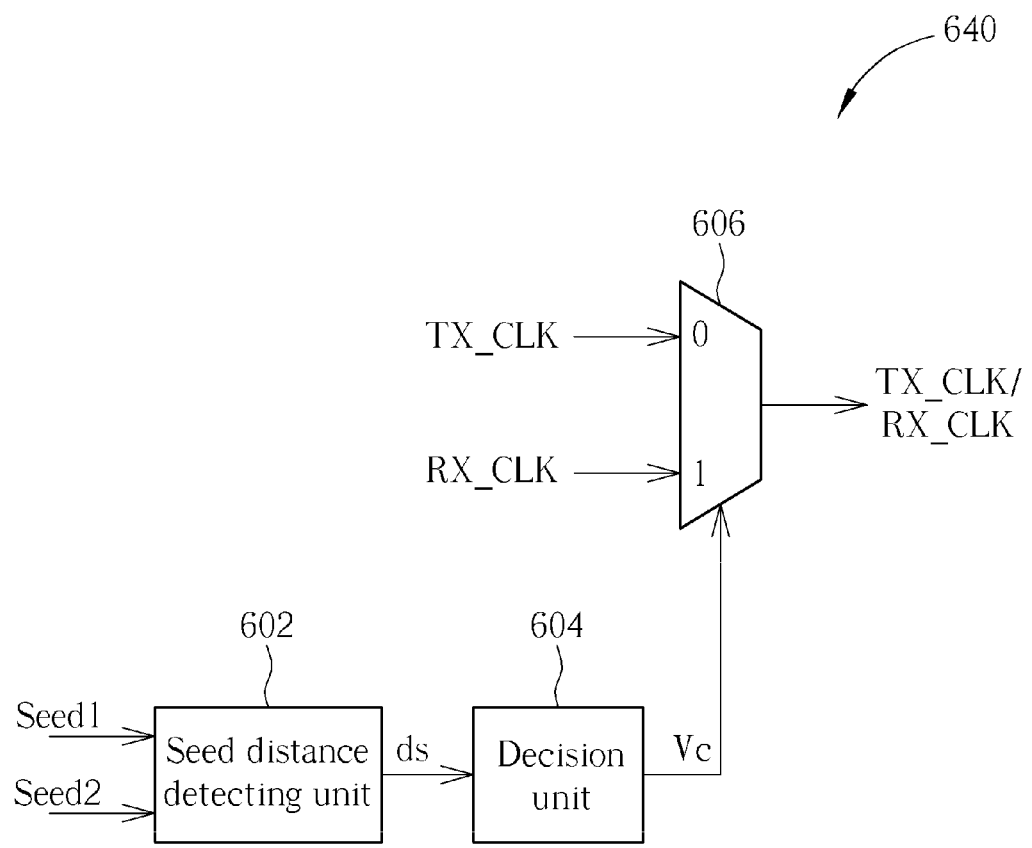
FIG. 6 is a diagram illustrating the master/slave decision device shown in FIG. 5 according to one embodiment.

In addition, please refer to FIG. 6. FIG. 6 is a diagram illustrating the master/slave decision device 540 according to one embodiment of the present invention. As shown in FIG. 6, the master/slave decision device 540 includes a seed distance detecting unit 602, a decision unit 604 and a multiplexer 606.

In the operations of the first network device 500, after the network connection is established, the scrambler 510 encodes the source stream DS to generate the transmission signal TS according to the first seed Seed1, and the descrambler 520 decodes the received signal RS from the second network device 580 to generate a second seed Seed2, where the second seed Seed2 can be regarded as a seed used by a scrambler of the second network device 580 to transmit the signal RS to the first network device 500. In addition, the timing recovery circuit 530 performs an timing recovery operation upon the received signal RS to generate a recovery clock RX_CLK, where a frequency of the recovery clock RX_CLK is substantially equal to a frequency of a local clock disposed in the second network device 580. Then, the master/slave decision device 540 determines the first network device 500 to be a master device or a slave device according to a seed distance between the first seed Seed1 and the second seed Seed2. If the first network device 500 is determined to be the master device, the first network device 500 uses its own local clock TX_CLK to transmit data; and if the first network device 500 is determined to be the slave device, the first network device 500 uses the recovery clock RX_CLK to transmit data.

In the operations of the master/slave decision device 540, when the network connection between the first network device 500 and the second network device 580 is established, the master/slave decision device 540 immediately determines the first network device 500 to be the master device or the slave device (e.g., within one second). In detail, in one embodiment of the present invention, when the seed distance ds is greater than A, the decision unit 604 determines the first network device 500 to be one of the master device and the slave device; when the seed distance ds is less than B, the decision unit 604 determines the first network device 500 to be another one of the master device and the slave device; and when the seed distance ds is between A and B, the decision unit 604 does not make a decision, and the first network device 200 will re-link to the second network device 280, where A, B are different integers. For example, A may be (1024+25), B may be (1024-25), where the value "25" is an estimated channel delay.

However, if the second network device 580 does not have the same master/slave decision mechanism as that of the first network device 500, both the first network device 500 and the second network device 580 may be set as master devices. To solve this problem, the decision unit 604 of the first network device 500 further includes a withdrawal mechanism, that is, after the decision unit 604 determines the first network device 500 to be the master device, the decision unit 604 will determine whether the second network device 580 is the slave device. If it is determined that the second network device 580 is not the slave device (i.e., the second network device 580 is the master device), the decision unit 604 resets the first network device 500 to be the slave device.

In one embodiment, the decision unit 604 may gather variations of the seed distance ds within a period of time, and may determine if resetting the first network device 500 to be the slave device according to the variations of the seed distance ds. In detail, if the variations of the seed distance ds is great, this represents that the second network device 580 may use its local clock to transmit data, therefore, the decision unit 604 determines that the second network device 580 is the master device, and the decision unit 604 then resets the first network device 500 to be the slave device. On the contrary, if the variations of the seed distance ds is small, this represents that the second network device 580 may use the recovery clock to transmit data, therefore, the decision unit 604 determines that the second network device 580 is the slave device, and the first network device 500 is still determined to be the master device.

In another embodiment, the decision unit 604 determines if resetting the first network device 500 to be the slave device according to a frequency difference between the local clock TX_CLK and the recovery clock RX_CLK. In detail, if the frequency difference between the local clock TX_CLK and the recovery clock RX_CLK is too great, this represents that the second network device 580 may use its local clock to transmit data, therefore, the decision unit 604 determines that the second network device 580 is the master device, and the decision unit 604 resets the first network device 500 to be the slave device. On the contrary, if the frequency difference between the local clock TX_CLK and the recovery clock RX_CLK is small, this represents that the second network device 580 may use the recovery clock to transmit data, therefore, the decision unit 604 determines that the second network device 580 is the slave device, and the first network device 500 is still determined to be the master device.

Figure 7:
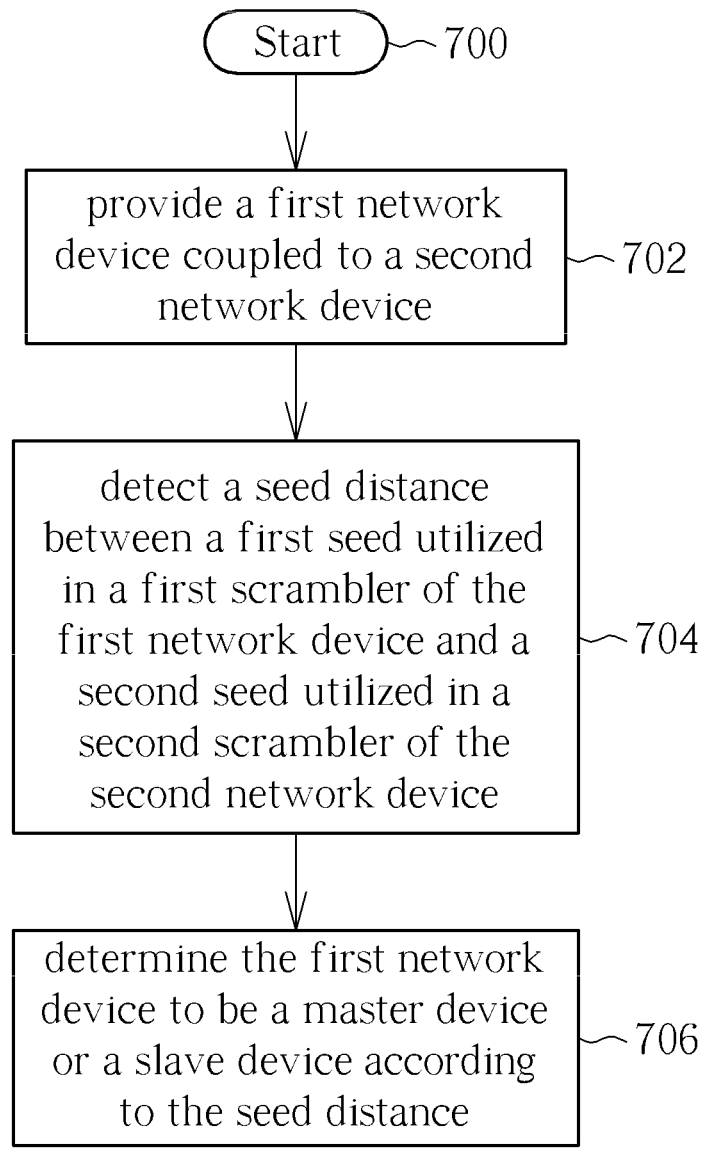
FIG. 7 is a flowchart of a master/slave decision method applied to a first network device.

Please refer to FIG. 7. FIG. 7 is a flowchart of a master/slave decision method applied to a first network device, where the first network device is coupled to a second network device. Referring to FIGS. 3, 6 and 7, the flow is described as follows:

Step 700: Start.

Step 702: provide a first network device coupled to a second network device.

Step 704: detect a seed distance between a first seed utilized in a first scrambler of the first network device and a second seed utilized in a second scrambler of the second network device.

Step 706: determine the first network device to be a master device or a slave device according to the seed distance.

Briefly summarized, in the master/slave decision device and master/slave decision method applied to a network device of the present invention, the network device can be automatically determined to be the master device or the slave device according to a seed distance between a scramble of the network and a scramble of another network device. Therefore, it can prevent the seed overlap issue between the two network devices and prevent influencing the following data processing operation.

Those skilled in the art will readily observe that numerous modifications and alterations of the device and method may be made while retaining the teachings of the invention.

What is claimed is:

1. A master/slave decision device applied to a first network device, wherein the first network device is coupled to a second network device, and the master/slave decision device comprises:

a seed distance detecting unit, for detecting a seed distance between a first seed utilized in a first scrambler of the first network device and a second seed utilized in a second scrambler of the second network device; and a decision unit, coupled to the seed distance detecting unit, for determining the first network device to be a master device or a slave device according to the seed distance;

wherein when the decision unit determines the first network device to be the master device, the first network device utilizes a first clock to transmit data; and when the decision unit determines the first network device to be the slave device, the first network device utilizes a second clock to transmit data, where the second clock is different from the first clock;

wherein the first clock is a local clock of the first network device, and the second clock is a recovery clock which is generated by performing a timing recovery operation upon a received data by the first network device; and wherein the decision unit determines if resetting the first network device to be the slave device according to a frequency difference between the first clock and the second clock.

2. The master/slave decision device of claim 1, wherein the first clock is a local clock of the first network device, and the second clock is a recovery clock which is generated by performing a timing recovery operation upon a received data by the first network device, where a frequency of the recovery clock is the same as a frequency of a local clock of the second network device.

3. The master/slave decision device of claim 1, wherein when the seed distance is between N and (−M), the decision unit determines the first network device to be the slave device, where N and M are positive integers, and N is different from M.

4. The master/slave decision device of claim 1, wherein when the seed distance is between N and M, or between (−M) and (−K), the decision unit determines the first network device to be the slave device; and when the seed distance is between M and (−K), the first network device re-links to the second network device, where N, M, K are positive integers, N is greater than M, and M is greater than K.

5. The master/slave decision device of claim 1, wherein when the seed distance is greater than A, the decision unit determines the first network device to be one of the master device and the slave device; when the seed distance is less than B, the decision unit determines the first network device to be another one of the master device and the slave device; and when the seed distance is between A and B, the decision unit does not make a decision, and the first network device re-links to the second network device, where A and B are different integers.

6. The master/slave decision device of claim 5, wherein after the decision unit determines the first network device to be the master device, the decision unit determines whether the second network device is the slave device; and when the decision unit determines that the second network device is not the slave device, the decision unit resets the first network device to be the slave device.

7. The master/slave decision device of claim 6, wherein the decision unit gathers variations of the seed distance within a period of time, and determines if resetting the first network device to be the slave device according to the variations of the seed distance.

8. The master/slave decision device of claim 1, wherein the first network device adopts High-Definition Multimedia Interface (HDMI) standard version 1.4.

9. A master/slave decision method applied to a first network device, wherein the first network device is coupled to a second network device, and the master/slave decision method comprises:

detecting a seed distance between a first seed utilized in a first scrambler of the first network device and a second seed utilized in a second scrambler of the second network device; and determining the first network device to be a master device or a slave device according to the seed distance;

wherein when it is determined that the first network device is the master device, the first network device utilizes a first clock to transmit data; and when it is determined that the first network device is the slave device, the first network device utilizes a second clock to transmit data, where the second clock is different from the first clock;

wherein the first clock is a local clock of the first network device, and the second clock is a recovery clock which is generated by performing a timing recovery operation upon a received data by the first network device, and the step of determining whether the second network device is the slave device comprises:

determining if resetting the first network device to be the slave device according to a frequency difference between the first clock and the second clock.

10. The master/slave decision method of claim 9, wherein the first clock is a local clock of the first network device, and the second clock is a recovery clock which is generated by performing a timing recovery operation upon a received data by the first network device, where a frequency of the recovery clock is the same as a frequency of a local clock of the second network device.

11. The master/slave decision method of claim 9, wherein the step of determining the first network device to be the master device or the slave device according to the seed distance comprises:

when the seed distance is between N and (−M), determining the first network device to be the slave device, where N and M are positive integers, and N is different from M.

12. The master/slave decision method of claim 9, wherein the step of determining the first network device to be the master device or the slave device according to the seed distance comprises:

when the seed distance is between N and M, or between (−M) and (−K), determining the first network device to be the slave device; and when the seed distance is between M and (−K), re-linking the first network device and the second network device, where N, M, K are positive integers, N is greater than M, and M is greater than K.

13. The master/slave decision method of claim 9, wherein the step of determining the first network device to be the master device or the slave device according to the seed distance comprises:

when the seed distance is greater than A, determining the first network device to be one of the master device and the slave device;

when the seed distance is less than B, determining the first network device to be another one of the master device and the slave device; and when the seed distance is between A and B, not to determining the first network device to be the master device or the slave device, and re-linking the first network device and the second network device, where A and B are different integers.

14. The master/slave decision method of claim 13, further comprising:
- after determining the first network device to be the master device, determining whether the second network device is the slave device; and
- when it is determined that the second network device is not the slave device, resetting the first network device to be the slave device.

15. The master/slave decision method of claim 14, wherein the step of determining whether the second network device is the slave device comprises:
- gathering variations of the seed distance within a period of time, and
- determining if resetting the first network device to be the slave device according to the variations of the seed distance.

16. The master/slave decision method of claim 9, wherein the first network device adopts High-Definition Multimedia Interface (HDMI) standard version 1.4.

* * * * *